United States Patent [19]
Kurbjuhn et al.

[11] Patent Number: 5,747,184
[45] Date of Patent: May 5, 1998

[54] JOINING ELEMENT ON A LANTHANUM CHROMITE BASE FOR HIGH-TEMPERATURE FUEL CELLS AND HIGH-TEMPERATURE ELECTROLYSIS CELLS

[75] Inventors: Manfred Kurbjuhn, Friedrichshafen; Detlef Stolten, Muehlhofen; Wolfgang Wagner, Deggenhausertal, all of Germany

[73] Assignee: Dornier GmbH, Friedrichshafen, Germany

[21] Appl. No.: 901,939

[22] Filed: Jul. 29, 1997

Related U.S. Application Data

[63] Continuation of Ser. No. 632,774, Apr. 15, 1996, abandoned.

[30] Foreign Application Priority Data

Apr. 15, 1995 [DE] Germany ............ 195 14 164.4

[51] Int. Cl.$^6$ .................... H01M 2/00; H01M 8/02
[52] U.S. Cl. .................... 429/31; 252/521
[58] Field of Search ................ 429/30, 31, 33; 252/518, 521

[56] References Cited

U.S. PATENT DOCUMENTS

| | | | |
|---|---|---|---|
| 5,080,689 | 1/1992 | Pal et al. ............... | 429/31 X |
| 5,387,476 | 2/1995 | Koch et al. . | |
| 5,389,456 | 2/1995 | Singh et al. . | |
| 5,426,003 | 6/1995 | Spengler et al. ......... | 429/27 |

FOREIGN PATENT DOCUMENTS

| | | |
|---|---|---|
| 0 188 056 A1 | 7/1986 | European Pat. Off. . |
| 338 823 | 10/1989 | European Pat. Off. . |
| 0 562 411 A1 | 9/1993 | European Pat. Off. . |
| 43 07 666 | 8/1994 | Germany . |
| 2-279524 | 11/1990 | Japan . |
| 6-219834 | 8/1994 | Japan . |
| 6-302326 | 10/1994 | Japan . |
| 7-237968 | 9/1995 | Japan . |

OTHER PUBLICATIONS

H.U. Anderson, J.H. Kou, D.M. Sparlin—Review of Defect Chemistry of LaMnO$_3$ and LaCrO$_3$ in: Proc. 1st Int. Symp. on solid Oxide Fuel Cells—Ed.: S.C. Singhal, The Electrochemical Society Penning, NJ 1989, pp. 111–128 (No Month).

R. Koc, H.U. Anderson, S.A. Howard, D.M. Sparlin—Structural, Sintering and Electrical Properties of Perowskite-Type (La,Sr) (Cr, Mn) O$_3$—pp. 265–270 (1989) (No Month).

S. Srilomsak, D.P. Schilling, H.U. Anderson—Thermal Expansion Studies on Cathode and Interconnect Oxides—pp. 77–83 (No Date).

N. Q. Minh, "Ceramic Fuel Cells"—J. Am. Ceram. Soc 76, pp. 563–568 (No Date).

H.U. Anderson, R. Murphy, K. Huphrey, et al. "Influence of Composition and Cation Stoichiometry on the Volatility, Electrical Conductivity and Thermal Expansion of LaCrO$_3$–Based Oxides" in The Rare Earth in Modern Science and Technology, pp. 55–61—Ed.: G.J. McCarthy, J.J. Rhyne, New York 1978 (No Month).

MAK–und Bat–Werte–Liste 1993 Mitteilung/Senatskommission zur Pruefung gesundheitsschaedlicher Arbeitsstoffe; 29 Duetsche Forschungsgemeinschaft, Weinheim 1993 (No Month).

Anderson et al "Compositional Dependence of Thermal Expansion, Lattice Parameters, Volatilization Rate and Electrical Conductivity of Lanthanum Chromite (LaCrO$_3$) Based Oxide" Chemical Abstracts vol. 92, No. 12, Mar. 24, 1980, Abstract No. 96698.

Chick et al "Synthesis of Air Sinterable Lanthanum Chromite Powders" Extended Abstracts, vol. 89/2, Jan. 1, 1989, p. 791.

Flandermeyer et al "High Temperature Stability of Magnesium–doped Lanthanum Chromite" Database Inspec No. 2681698 (No Date).

Anderson et al, "Air Sinterable Solid Oxide Fuel Cell Interconnects" Fuel Cell—1990 Fuel Cell Seminar of Nov. 25–28 in Pheonix, Arizona.

Chick et al., "Air–Sinterable Mechanisms of Chromites" Solid Oxide Fuel Cells—Seminar of Jul. 2–5, 1991 in Athens, Greece.

W. J. Weber, C. W. Griffin, J. L. Bates, Effects of Cation Substitution on Electrical and Thermal Transport Properties of YCrO$_3$ and LaCrO$_3$, J. Am. Ceram. Soc., vol. 70, pp. 265–270 (1987) (No Month).

Proceedings of the Second International Symposium on Solid Oxide Fuel Cells, Jul. 2–5, 1991, Athens, Greece, Eds.: F. Grosz, P. Zegers, S. C. Singhal, O. Yamamoto, Office for Official Publications on the European Communities, Luxembourg 1991, Report EUR 13456 EN.

Program and Abstracts, 1990 Fuel Cell Seminar, Nov. 25–28, 1990 Phoenix, Arizona (No Month).

*Primary Examiner*—Anthony Skapars
*Attorney, Agent, or Firm*—Evenson McKeown Edwards & Lenahan, PLLC

[57] ABSTRACT

The present invention relates to a self-supporting joining element for planar high-temperature fuel cells for high-temperature electrolysis cells comprising the material $La_{1+\delta}Mg_xAl_yCr_{1-x-y}O_{3\pm\epsilon}$ wherein $0 \leq \delta \leq 0.1$;
$0.02 \leq x \leq 0.0$;
$0.1 \leq y \leq 0.25$; and
$0 \leq \epsilon \leq 0.1$.

5 Claims, 1 Drawing Sheet

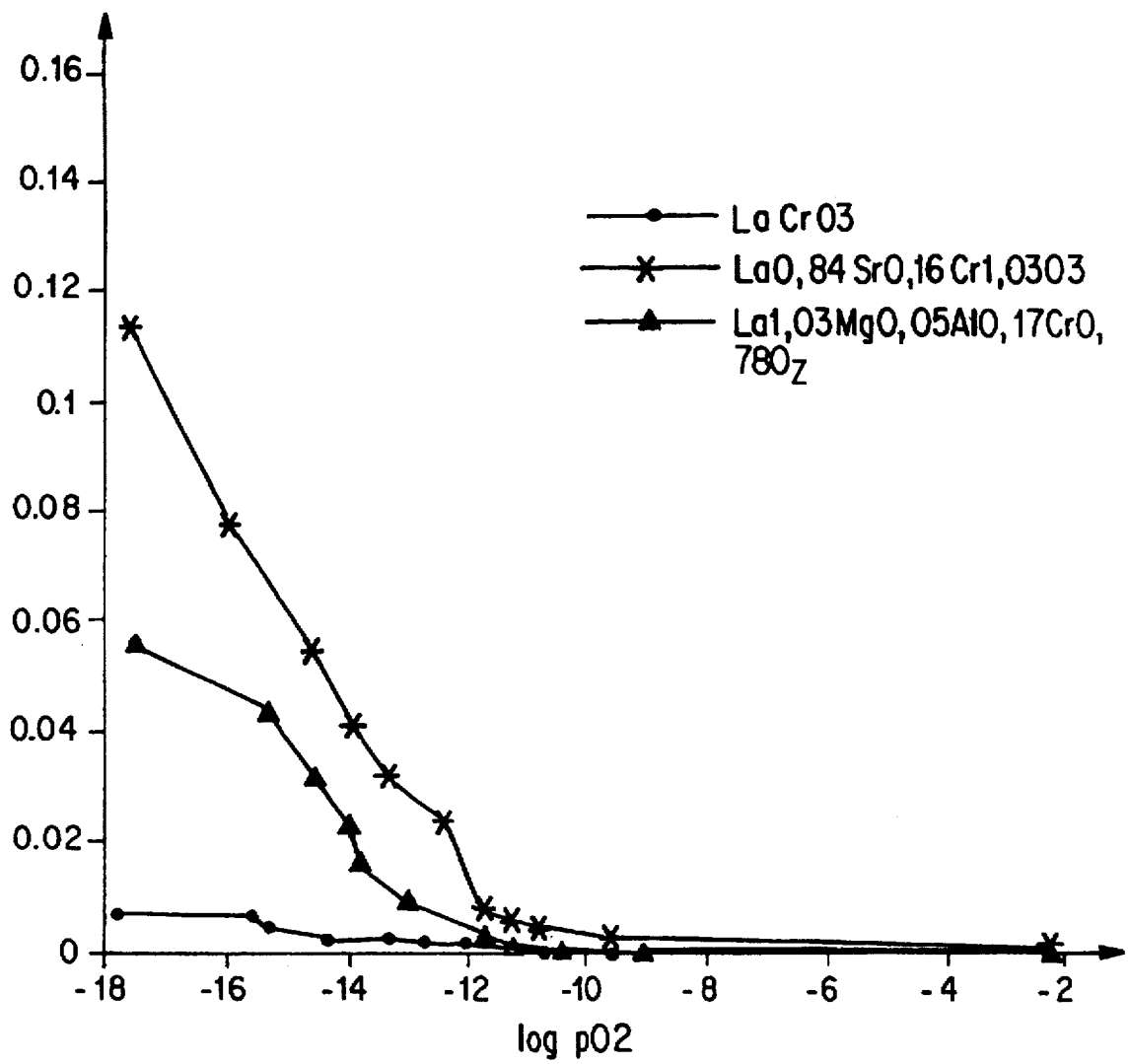

JOINING ELEMENT ON A LANTHANUM CHROMITE BASE FOR HIGH-TEMPERATURE FUEL CELLS AND HIGH-TEMPERATURE ELECTROLYSIS CELLS

This application is a continuation of application Ser. No. 08/632,774, filed Apr. 15, 1996, and now abandoned.

BACKGROUND AND SUMMARY OF THE INVENTION

This invention relates to a joining element on a lanthanum chromite base for high-temperature fuel and electrolysis cells. High-temperature fuel cells (solid oxide fuel cells, sofc) are electrochemical energy converters which electrochemically generate electric energy directly from fuel gases (for example, $H_2$, $CO$, $CH_4$) while bypassing the combustion process. They are usually based on cubic, stabilized zirconium oxide as the oxygen-ion conducting solid electrolyte and operate in a temperature range of from 800°–1,000° C.

An intended application of the present invention is for decentralized stationary high-efficiency systems for generating current from natural gas. Also possible are combinations connecting gas and steam turbines. In the U.S., mobile applications are particularly discussed. The direct energizing of fuel gases offers significant ecological advantages as compared to thermal engines, such as:

lower $CO_2$-stress because of a higher efficiency;

negligible $NO_x$-emissions because of a lower working temperature of 1,000° C.;

can be used in a decentralized manner because of the modular construction.

The arrangement described for fuel cells may also be used for the reversal process of high-temperature electrolysis. In this case, hydrogen is produced at high efficiency from water in a temperature range of from 800° to 1,000° C.

A planar cell design is advantageous in view of the efficiency and high energy density. In conventional arrangements, thin solid electrolyte plates are coated on both sides with porous electrodes. Several electrolytes with electrodes are stacked alternately with joining elements on top of one another so that a bipolar arrangement is created which corresponds to a serial connection of several cells. These cell composites can be connected further by way of gas lines and electric lines.

In the prior art, the following materials are preferably used for such arrangements:

Electrolyte $ZrO_2$ with $CaO$, $MgO$, $Y_2O_3$ or another rare earth oxide dopant, and partially also with an $Al_2O_3$-addition;

Fuel Gas Electrode

Metal-ceramic composite material with nickel or cobalt as a metallic component and doped $CeO_2$ or $ZrO_2$ as a ceramic component;

Air Electrode

Doped oxides with a perovskite structure, such as $La_{1-x}Ca_xMnO_3$ $La_{1-x}Sr_xMnO_3$ $La_{1-x}Sr_xCo_yMn_{1-y}O_3$

Joining Element

Either ceramic materials on a lanthanum chromite base or metallic materials on a chrome base are used for this purpose. The ceramic materials offer advantages because of their resistance to oxidation. Usually, the lanthanum chromites are doped with Mg, Ca or Sr.

The above-mentioned components are joined by processes such as soldering with glass, glass ceramics or metallic high-temperature solders, or sintering. The resulting cell stacks are preferably airtight. However, according to the design and lay-out, complete airtightness is not absolutely necessary.

The components are also connected with one another mechanically by the joining processes. Therefore, the mechanical/thermomechanical characteristics of the various components in such a cell stack must be well adapted to one another in order to avoid or at least reduce mechanical tensions. This means essentially that the thermal expansion of the other components must be adapted to that of the zirconium oxide since the solid electrolyte represents the component with the lowest interference possibilities with respect to the characteristics of the material.

At very low partial oxygen pressures, as seen on the fuel gas side of fuel cells or on the hydrogen side of electrolysis cells, the lanthanum chromite will expand slightly. The expansion results from the change in valency of chrome ions and thus on the alteration of the ion radius. As a result of the swelling, additional mechanical tensions occur in the stack during operation because only the lanthanum chromite exhibits this swelling, but not the other components solidly connected to the lanthanum chromite base.

The electrical conductivity is another significant quantity that can be adjusted to optimize use of the material. Since, in each case, the current in a cell stack flows through the joining elements, the lanthanum chromite should have an electric conductivity which is as high as possible, which depends considerably on the doping.

The significant factors affecting optimization of the material are therefore:

thermal expansion swelling electrical conductivity.

Connection Between Electric Conductivity and Swelling

Generally, lanthanum chromite is doped for use in fuel cells in order to increase the conductivity of the pure material of approximately 1 $Scm^{-1}$ and the linear thermal expansion of approximately $\alpha_{20/1,000}=9.0 \cdot 10^{-6}K^{-1}$ to that of the electrolyte material (for doped zirconium oxide, $\alpha_{20/1,000}=10.5 \cdot 10^{-6}K^{-1}$). (See H. U. Anderson, J. H. Kuo, D. M. Sparlin, *Review of Defect Chemistry of LaMnO₃*, Proc. 1st Int. Symp. on Solid Oxide Fuel Cells, S. C. Singhal, The Electrochemical Society, Pennington, N.J. 1989, pp. 111–128; R. Koc, H. U. Anderson, S. A. Howard, D. M. Sparlin, *Structural, Sintering and Electrical Properties of Perowskite-Type (La,Sr) (Cr,Mn)O₃*, Proc. 1st Int. Symp. on Solid Oxide Fuel Cells, S. C. Singhal, The Electrochemical Society, Pennington, N.J. 1989, pp. 220–241; W. J. Weber, C. W. Griffin, J. L. Bates, *Effects on Cation Substitution on Electrical and Thermal Transport Properties of YCrO₃ and LaCrO₃*, J. Am. Ceram. Soc., 70, 265–279 (1989).) During doping, a portion of the trivalent ions of the perovskite compound ($ABO_3$) is substituted by bivalent ions, such as Mg, Ca or usually Sr. This substitution increases the number of load carriers such that to maintain electroneutrality, the valency of the chrome is partially increased from +3 to +4. The electrical conductivity therefore increases with the doping concentration and takes place according to the low polaron mechanism. (See Anderson et al., Koc et al., and Weber et al. cited above.) During reduction (admission of fuel gas), oxygen is removed from the compound. Because of the electroneutrality, the removal results in that the chrome, which is quadrivalent because of doping, is converted into trivalent chrome and thus has a larger ion radius. This change of valency leads to macroscopic swelling (dilatation) of the material.

The perovskite structure in which the oxygen has been removed is hereinafter referred to as $ABO_{3\pm\epsilon}$. In this case, $\epsilon$ is at a maximum approximately in the area of alkaline earth dopings, i.e., essentially, only so much oxygen is removed so that electroneutrality can be maintained by a valency change from $Cr^{4+}$ to $Cr^{3+}$. Furthermore, oxygen is removed to a significant degree only under extreme reduction conditions with the decomposition of the material, which does not occur in high-temperature fuel cells.

Doping

Sr-doped $LaCrO_3$ is used primarily in fuel cells. In this case, the Sr-concentration is usually 16 atomic % in the A-position. (See Proc. Int. Symp. on Solid Oxide Fuel Cells, 2–5 Jul. 1990, Athens, F. Gross, P. Zegers, S. C. Singhal, O. Yamamoto Office for Official Publications on the European Communities, Luxembourg 1991, Report EUR 13456 EN; Abstracts 1990 Fuel Cell Seminar Nov. 25–28, 1990 Phoenix, Ariz.) As a result, good results are achieved with a conductivity of approximately 10 $Scm^{-1}$ and a thermal expansion of approximately $\alpha_{20/1,000}=10.3 \cdot 10^{-6} K^{-1}$. However, a 0.11% swelling of the material is too high and results in cracks in the sintered cell stack on the admission of fuel gas. A comparison with the breaking expansion of cubically stabilized zirconium oxide shows that the above-mentioned swelling is critical for the stack. In the case of a median breaking tension of 300 MPa and a modulus of elasticity (Young's modulus) of 200 GPa, zirconium oxide has a breaking expansion of 0.15%. However, since the median breaking tension is used, most of the specimens break at the above-mentioned expansion. The value of the breaking expansion is in the range of the swelling value for Sr-doped lanthanum chromite. Since the deformations in planar fuel cells occurring as a result of swelling are transmitted by the thicker lanthanum chromite joining element directly to the thin zirconium oxide electrolyte, damage can be observed in cases with a swelling of 0.11%.

Although by doping with Mg (see European Patent Document No. EP 338,823), the conductivity can be increased, the thermal expansion cannot be adapted to that of the zirconium oxide. In addition, the orthorhombic/rhombohedral phase transition of the material will remain. (See S. Srilomsak, D. P. Schilling, H. U. Anderson, *Thermal Expansion Studies on Cathode and Interconnect Oxides*.) An advantage of doping with Mg is that the swelling is less than when doping with strontium. (See Srilomsak et al. cited above.)

If the B-position of the perovskite lanthanum chromite is doped with Al (see European Patent Document No. EP 338,823), the thermal expansion can be adapted to that of zirconium oxide. However, then approximately 30 atomic % doping on the B-position would be required. The electrical conductivity would then be reduced because of "thinning" of the chrome ions causing these characteristics. (See Srilomsak et al. cited above.)

Sintering Action/Water Vapor Constancy at Room Temperature

Lanthanum chromite is very difficult to sinter and can be sintered only at very high temperatures, that is, at temperatures above 1,700° C. This is attributed to a chrome oxide layer which forms on the material at the beginning of the sintering. (See N. Q. Minh, *Ceramic Fuel Cells*, J. Am. Ceram. Soc. 76, 563–568 (1993).) Sintering is frequently promoted at high cost by the addition of sintering expedients such as fluorides, or by doping with substances that form meltings such as cobalt. It is known that a B-position deficiency or an A-position excess of perovskite compound results in an improved sintering action. (See H. U. Anderson, R. Murphy, K. Huphrey, et al. *Influence of Composition and Cation Stoichiometry on the Volatility, Electrical Conductivity and Thermal Expansion of LaCrO₃-based Oxides*, The Rare Earths in Modern Science and Technology, G. J. McCarthy, J. J. Rhyne, New York 1978, pp. 55–61.)

However, when a sintered part is stored for long periods of time in air at room temperature, this B-position deficiency results in a decomposition of the compounds by lanthanum hydrolysis in calcium- and strontium-doped lanthanum chromites. The doping range is approximately 10 to 20 atomic % substitution at the A-position of the perovskite in this case.

Chromate Content

Strontium- and calcium-doped lanthanum chromites which are resistant to decomposition require a B-position excess which results in considerable chromate fractions (chrome VI). Such chrome VI compounds which are water-soluble are classified as cancer-causing Category A2 substances (clearly causing cancer in animal tests). (See MAK- und BAT-Werte-Liste 1993 Mitteilung/Senatskommission zur Prüfung gesundheitsschädlicher Arbeitsstoffe, 29 Deutsche Forschungsgemeinschaft Weinheim 1993.) The limit for classification as a cancer-causing substance in this case is 1,000 mg metallic chromate/kg lanthanum chromite (1%). Strontium- and calcium-doped lanthanum chromites with a B-position excess that are resistant to decomposition, have chromate contents above this limit of up to 10,000 mg/kg (10%).

Therefore, an object of the present invention is to provide a material for a self-supporting joining element for use in planar high-temperature fuel cells or electrolysis cells which is adapted to the other components used in the cell stack, particularly the solid electrolytes on a zirconium oxide base, while considerably reducing the swelling with respect to Sr-doped lanthanum chromite.

When using planar high-temperature fuel or electrolysis cells with self-supporting joining elements or electrolytes, much more precise adaptations of the thermomechanical characteristics are required than when using cells which are constructed of thin-layer systems. Furthermore, a higher electrical conductivity is required.

Another important requirement is the fact that the material can be compressed by sintering so that it is airtight with respect to hydrogen at operating temperatures. Thus, a closed porosity (sintering density >96% of the theoretical density) for the sintered material must be achieved.

Therefore, an object of the present invention is to provide a material having the following characteristics:

$\alpha_{20/1,000}$=9.7 to $10.4 \cdot 10^{-6} K^{-1}$ linear swelling $\leq 0.06\%$ at 1,000° C. and $P_{O_2}=10^{-18}$ bar in air electrical conductivity $\sigma \leq 5$ $Scm^{-1}$ in air at 1,000° C.

electrical conductivity $\sigma \leq 1$ $Scm^{-1}$ in fuel gas with $P_{O_2}10^{-16}$ bar at 1,000° C.

long-term resistance to decomposition by hydrolysis in an aqueous or water-vapor-containing environment densely sinterable at temperatures $\leq 1,650°$ C.

These and other objects are achieved according to the present invention by a self-supporting joining element for planar high-temperature fuel cells or high-temperature electrolysis cells, comprising the material

$La_{1+\delta}Mg_xAl_yCr_{1-x-y}O_{3\pm\epsilon}$ wherein $0 \leq \delta \leq 0.1$;

$0.02 \leq x \leq 0.0$;

$0.1 \leq y \leq 0.25$; and $0 \leq \epsilon \leq 0.1$.

In this case, the B-position of the perovskite lanthanum chromite structure is doped with Mg as well as with Al ions. The joining element may also further comprise up to 1 mol % of at least one doping element selected from the group consisting of Y, Ca, Sr, Fe, Co, Ni, Ti, and Si.

The parameter $\epsilon$ arises from oxygen removal under reducing conditions and is a function of the respective partial oxygen pressure. In this respect, $O_{3\pm\epsilon}$ is hereinafter also designated as $O_z$.

By using the mixed dopings of the present invention, the swelling can be considerably reduced while the conductivity is good and the thermal expansion is adapted to the solid electrolyte material. The joining element according to the present invention may also be used for other solid electrolyte materials in addition to solid electrolyte materials on a zirconium base, if the thermal expansion of the other materials is between approximately 9.5 and $11 \cdot 10^{-6} K^{-1}$.

As explained further below, in addition to the above-mentioned physical characteristics which are advantageous for use in planar fuel cells, the material according to the present invention has additional advantageous characteristics:

increased sintering activity by avoiding free chromates because of A-position excess with a simultaneous resistance to attack by water and water vapor;

reduced toxicity because of low chromate content, which does not exceed 10% of the current limit caused by A-position excess.

Sintering Action/Water Vapor Resistance at Room Temperature

Generally, a differentiation is made in the case of the perovskite lanthanum chromite structure $ABO_3$ between A-lattice sites (A-positions) which are occupied by La-ions and B-lattice sites (B-positions) which, in the case of pure lanthanum chromite are occupied by Cr ions and in the case of the compound according to the present invention, are occupied by Mg and Al ions. As a result of the vacancies in the crystal lattice, the relationship of the occupied A-positions and B-positions can be changed within narrow limits. According to the present invention, the joining element of the present invention preferably has a ratio of occupied A-lattice sites to occupied B-lattice sites of more than 1.0.

In the case of the compound according to the present invention, the sintering temperature can be lowered in a B-position excess from $1,750°$ C. for strontium-doped lanthanum chromite (LSC) to $1,650°$ C. for Mg/Al doped compounds. In both cases, a sintering density of above 98% is achieved, which explains why these indicated temperatures are slightly higher than otherwise customary in the literature. Generally, the sintering densities cited in the literature are not more than 94%.

The use of Mg/Al dopings which have an A-position excess result in a lowering of the sintering temperature. The sintering temperature can be lowered to $1,600°$ C. at 98% sintering density. Thus, sintering has become possible in furnaces which are used in industrial production for technical ceramics without having to disadvantageously add fluxing agents.

The Mg/Al doped lanthanum chromite compounds according to the present invention do not show decomposition by water or water vapor attack at room temperature or at raised temperatures. An advantage in using these dopings is therefore that it is possible to utilize the overstoichiometry of the A-position to improved the sintering action.

Chromate Content

The Mg/Al doped materials according to the present invention, in the case of A-position excess, preferably have chromate contents <100 mg/kg and are therefore not subject to relevant regulations regarding manufacturing, processing and transportation of hazardous chemical substances. In fact, for example, an A-position excess of approximately 1%, corresponding to the formula $La_{1+\delta}Mg_xAl_yCr_{1-x-y}O_z$ wherein $\delta \approx 0.01$, $0.02 \leq x \leq 0.1$ and $0.1 \leq y \leq 0.25$ is sufficient. The use of the materials according to the present invention significantly lowers the processing costs because of lower health and safety standard conditions. In any case, the described chromate problems relate only to the powdery substances seen during manufacturing. After sintering, none of the materials have chromate contents above the limit.

Manufacturing

The material according to the present invention can be manufactured by chemical methods, such as reaction spray methods, sol-gel processes or precipitation. The material can also be manufactured by the mixed oxide method by powder mixing or a one-time or multiple time calcining as well as by reaction sintering.

Other objects, advantages and novel features of the present invention will become apparent from the following detailed description of the invention when considered in conjunction with the accompanying drawings.

BRIEF DESCRIPTION OF THE DRAWINGS

The sole FIGURE is a graph showing the swelling as a function of partial oxygen pressure for various materials.

DETAILED DESCRIPTION OF A PREFERRED EMBODIMENT

The lanthanum chromite doped according to a preferred embodiment of the present invention is produced by reaction spraying from aqueous salt solutions. The powders are produced from the desired metal chlorides: $CrCl_3 * n H_2O$, $MgCl_2 * n H_2O$, $AlCl_3 * n H_2O$ and $LaCl_3 * H_2O$. Equimolar quantities corresponding to the desired powder composition are dissolved in water and are pyrolized by spraying into a reaction tube heated to $1,300°$ C. The resulting mixed oxide is separated from the gas flow $HCl/H_2O$ by cyclone depositing. A washing tower connected downstream separates the HCl from the waste gas. The powder thus obtained is then calcined in a rotary tubular kiln at $1,200°$ C. and ground in an annular-gap ball mill in water to a median grain size of 0.7 μm. After drying the powder by freeze drying, the resulting castable foil slick is homogenized with a solvent, a binding agent, a plasticizing agent and a liquefying agent in a tumbling mill and subsequently cast to form a foil. The specimens are made from the foil by punching and laminating and are then sintered in two stages in a batch furnace. The two stages, stage 1 and stage 2, respectively relate to the expulsion of organic matter at $500°$ C. and sintering at $1,600°$ C.

Table 1 compares the physical characteristics of individual materials according to the present invention with conventional materials.

TABLE 1

| SUBSTANCE | $\alpha_{20/1,000}$ | swelling*/% | $\sigma_{el}$****/Scm$^{-1}$ |
|---|---|---|---|
| LaCrO$_3$ | 9.0*** | 0.007 | ≈1 |
| LSC** 16%-doped | 10.3 | 0.16 | 15 |
| La$_{0.99}$Mg$_{0.05}$Cr$_{0.95}$O$_x$ | 9.0*** | 0.007 | 3.1 |
| La$_{1.03}$Mg$_{0.05}$Al$_{0.17}$Cr$_{0.78}$O$_z$ | 10.1 | 0.06 | 6 |
| La$_{1.03}$Mg$_{0.05}$Al$_{0.14}$Cr$_{0.81}$O$_z$ | 10.0 | 0.06 | 6 |
| La$_{1.03}$Mg$_{0.05}$Al$_{0.12}$Cr$_{0.83}$O$_z$ | 9.8 | 0.04 | 6 |

*at P$_{O2}$ = 10$^{-18}$ bar
**strontium-doped lanthanum chromite
***phase change not orthorhombically/rhombohedrally suppressed
****measured in air (P$_{O2}$ = 0.21 bar)

In addition to the three materials according to the present invention, the table also lists LaCrO$_3$, strontium-doped lanthanum chromite and Mg-doped lanthanum chromite. The materials according to the present invention are distinguishable because of a good adaptation of the expansion coefficient $\alpha_{20/1,000}$ to zirconium oxide (by $10 \cdot 10^{-6}$K$^{-1}$) as well as a moderate swelling (less than 0.06%) with a relatively high electrical conductivity in air (higher than 5 Scm$^{-1}$).

The composition La$_{1.03}$Mg$_{0.05}$Al$_{0.17}$Cr$_{0.78}$O$_z$ is particularly preferred. Its conductivity is less than that of the LSC only in the oxidizing area. However, because of the particularly good conductivity in the reducing area, the conductivity of the newly developed material in fuel cells in which one side oxidizes (air) and the other side reduces (fuel gas), is equivalent to that of LSC. Table 2 shows the relationship between the oxidizing and reducing conductivities of LSC and the preferred material according to the present invention.

TABLE 2

| SUBSTANCE | $\sigma_{el}$/Scm$^{-1}$* | $\sigma_{el}$/Scm$^{-1}$** |
|---|---|---|
| LSC*** 16%-doped | 12 | 0.7 |
| La$_{1.03}$Mg$_{0.05}$Al$_{0.17}$Cr$_{0.78}$O$_z$ | 6 | 1.4 |

*in air (at P$_{O2}$ = 0.21 bar)
**in fuel gas (at P$_{O2}$ = 10$^{-16}$ bar)
***strontium-doped lanthanum chromite The FIGURE plots the swelling as a function of the partial oxygen pressure at a temperature of 1,000° C. for pure lanthanum chromite, lanthanum chromite doped with 16% strontium, as well as for a material with 5% Mg/16% Al according to the present invention. The FIGURE clearly demonstrates that the swelling of the material according to the present invention is considerably reduced with respect to the swelling of the Sr-doped lanthanum chromite.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A self-supporting joining element for planar high-temperature fuel cells or high-temperature electrolysis cells, consisting essentially of a material $$La_{1+\delta}Mg_xAl_yCr_{1-x-y}O_{3\pm\epsilon}$$

wherein $0 \leq \delta \leq 0.1$;

$0.02 \leq x \leq 0.0$;

$0.1 \leq y \leq 0.25$; and $0 \leq \epsilon \leq 0.1$;

and wherein the material has a linear thermal expansion of $\alpha_{20/1,000} = 9.7$ to $10.4 \cdot 10^{-6}$K$^{-1}$; a linear swelling $\leq 0.06\%$ at 1,000° C. and p$_{O2}$ = $10^{-18}$ bar in air; an electrical conductivity $\sigma \geq 5$ Scm$^{-1}$ in air at 1,000° C.; and an electrical conductivity $\sigma \geq 1$ Scm$^{-1}$ in fuel gas with p$_{O2}$ = $10^{-16}$ bar at 1,000° C.

2. The joining element according to claim 1, wherein the material is La$_{1.03}$Mg$_{0.05}$Al$_{0.17}$Cr$_{0.78}$O$_{3\pm\epsilon}$ with $0 \leq \epsilon \leq 0.1$.

3. The joining element according to claim 1, wherein the ratio of occupied A-lattice sites to occupied B-lattice sites is more than 1.0.

4. The joining element according to claim 1, further comprising up to 1 mol % of at least one doping element selected from the group consisting of Y, Ca, Sr, Fe, Co, Ni, Ti, and Si.

5. The joining element according to claim 1, comprising less than 100 mg chromate per kg lanthanum chromite.

* * * * *